Sept. 30, 1924.

D. NECHRONI

PORT LIGHT

Filed Dec. 9, 1922    2 Sheets-Sheet 1

1,510,330

WITNESSES
Edw. Thorpe
J. L. McAuliffe

INVENTOR
Daniel Nechroni
BY
Munn & Co.
ATTORNEYS

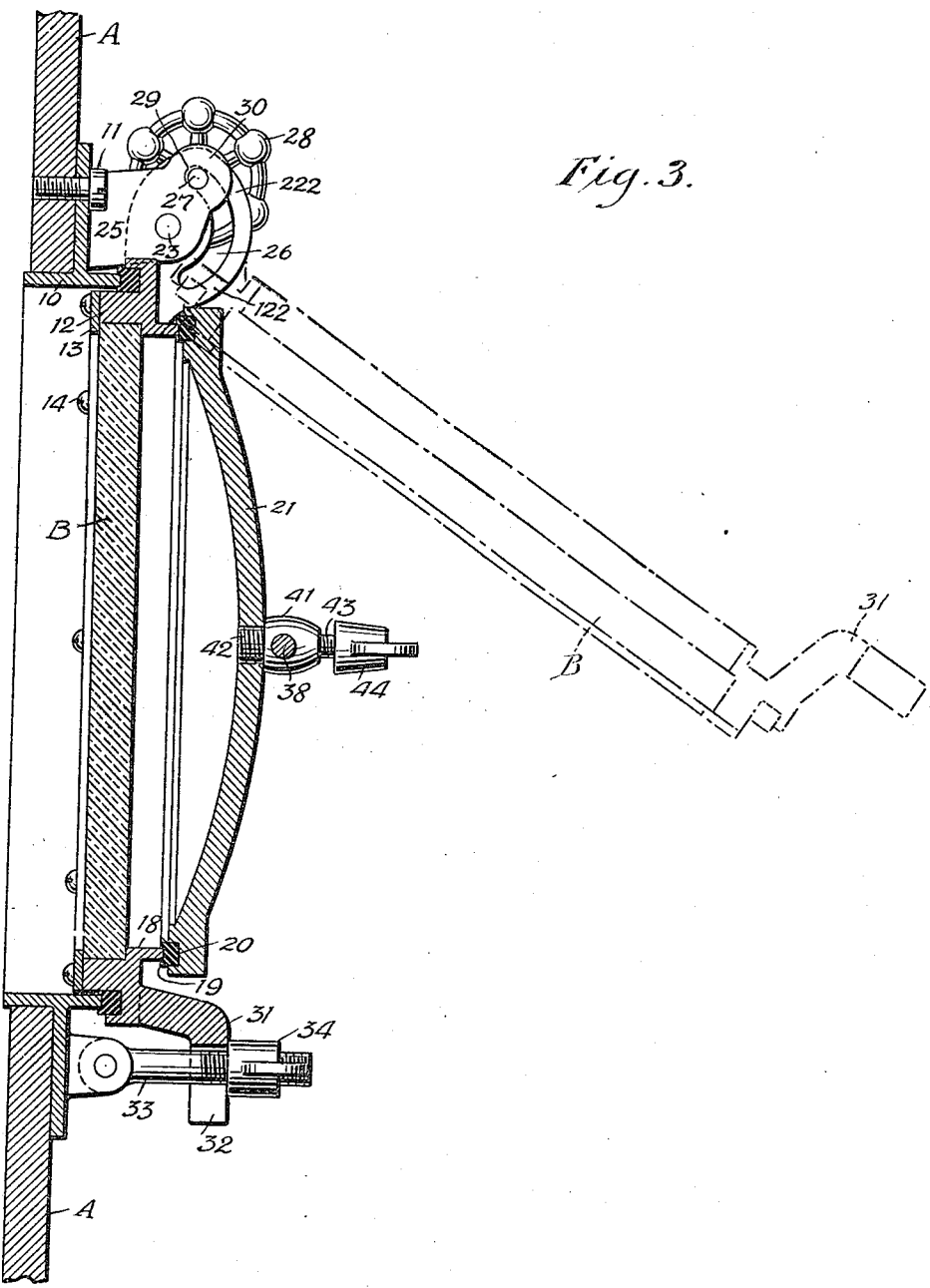

Patented Sept. 30, 1924.

1,510,330

UNITED STATES PATENT OFFICE.

DANIEL NECHRONI, OF BROOKLYN, NEW YORK.

PORT LIGHT.

Application filed December 9, 1922. Serial No. 605,866.

*To all whom it may concern:*

Be it known that I, DANIEL NECHRONI, a citizen of the United States of America, and a resident of the city of New York, borough of Brooklyn, in the county of Kings and State of New York, have invented a new and Improved Port Light, of which the following is a description.

My invention relates to port lights for marine vessels and particularly relates to means associated with the port light and means associated with the dead light or shutter for permitting adjustment of said port light and its shutter.

The general object of my invention is to obviate the necessity of employing unsatisfactory expedients now utilized for holding the port light or its shutter, or both, open to the desired extent. The means now employed are open to various objections as inconvenient, insecure, or as offering obstruction at the interior of the cabin or other part of the ship having the port light.

I attain the stated objects and others as will appear through the medium of locking means associated, in the case of the glazed port light, with the hinge elements of said light and in the case of the shutter or dead light through the medium of a hinge rod having adjustable sliding connection with the shutter and pivotally secured to the frame of the port light, both the port light and shutter having appurtenances including means to hold the port light and shutter in any desired angular adjustment.

The nature of the invention and its distinguishing features and advantages will more clearly appear as the description proceeds.

Reference is to be had to the accompanying drawings forming a part of this specification, it being understood that the drawings are merely illustrative of one example of the invention.

Figure 3 is a section on the line 3—3, Figure 1.

Figure 1:
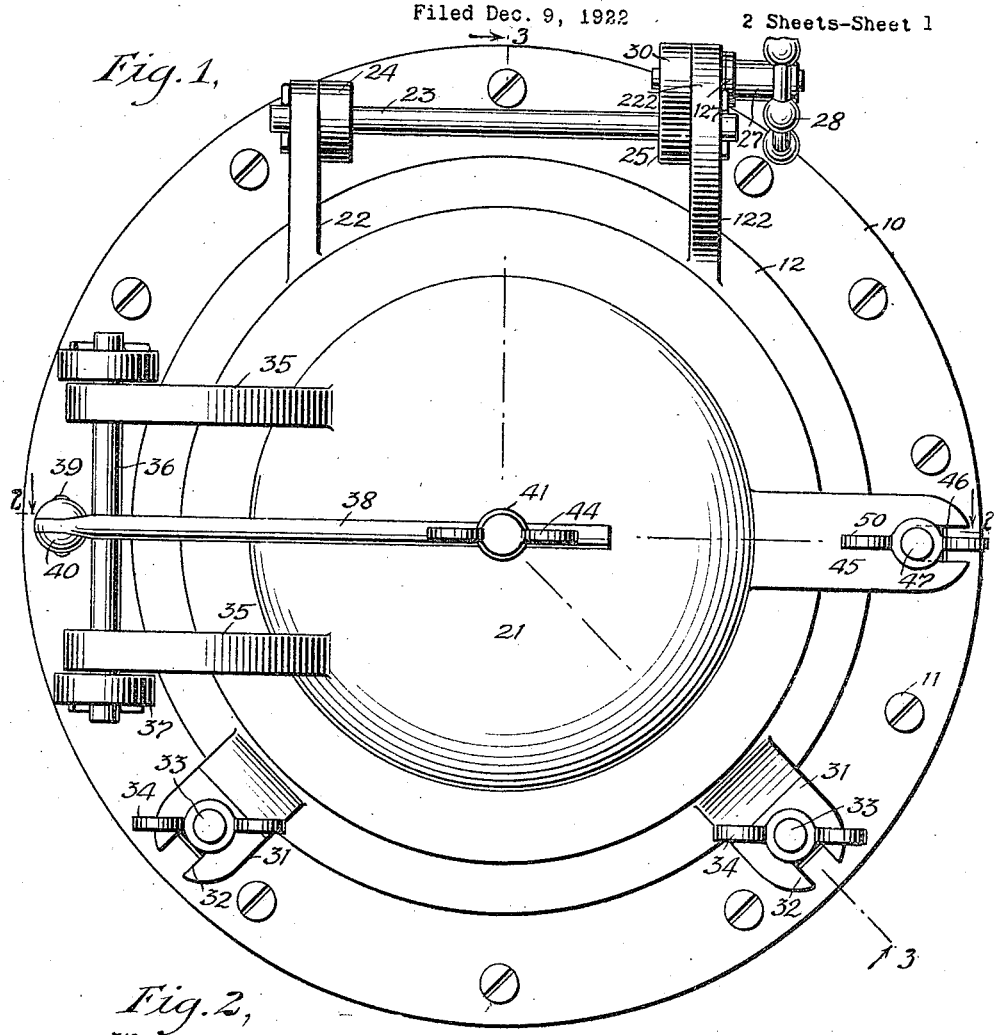
Figure 1 is a front elevation of a port light and shutter therefor embodying my invention.
Figure 2:
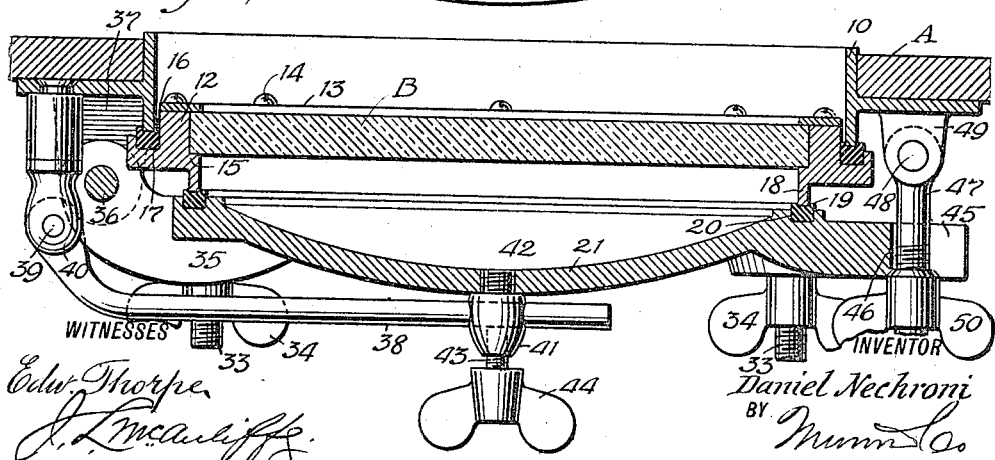
Figure 2 is a section on the line 2—2, Figure 1.

In the illustrated example of my invention the general main features of an ordinary port light and shutter are preserved. The circular frame 10, T-shaped in cross section is known and secured to the hull A by screws 11, as usual. The numeral 12 indicates the frame of the port light, the glass B of which is held in position by a retaining ring 13, secured by screws 14 between said ring and the rabbet 15 forming a seat for said glass. Frame 10 at the head thereof is engaged by an annular gasket or packing ring 16 in a groove 17 of frame 12. The annular flange 18 of the port light frame 12 is engaged by the annular gasket 19 seated in the annular groove 20 of the shutter or dead light 21. All the parts referred to are known and form no part of the present invention.

My improved means for securing the port light frame 12 in any desired angular adjustment are associated with the hinge lugs of the frame 12, said lugs designated 22 and 122. The usual hinge pin 23 passes through the lugs 22 and 122 and has bearings in lugs 24, 25 rigid with the main frame 10. The one hinge lug 122 is extended in carrying out my invention, as at 222, to provide for the formation of an arcuate slot 26 in said lug and its extension.

A locking spindle 27 has a hand wheel 28. Said spindle passes through slot 26 and has its reduced end engaged in a threaded hole 29 in the extension 30 formed on the lug 25. The arrangement is such that the turning of the handle 28 and the spindle 27 will cause said spindle to move axially in the hole 29 and thereby cause a collar 127 on said spindle to bind against the hinge lug 222 and cause said hinge lug 222 to bind firmly against the fixed lug 25 and its extension 30. Thus, the port light frame 12 may swing through an arc with the hinge pin 23 as the center and then be clamped firmly by the spindle 27 in the adjusted angular position of said frame 12. The port light frame 12 is fastened in the closed position by the usual means comprising the lugs 31 on said frame 12 having slots 32 to receive swing bolts 33 having wing nuts 34.

The shutter 21 is hinged to swing on an axis at right angles to hinge pin 23 of port light frame 12. Said shutter 21 as is customary has rigid hinge lugs 35 thereon swingable on a hinge pin 36 turning in bearing lugs 37 on the frame 10. I provide a rod 38 extending from adjacent the pin 36 across the center of shutter 21. Said rod 38 is pivoted at its outer end by a transverse pin 39 passed through a rigid hinge lug 40 on frame 10 equidistant from the lugs 35. The rod 38 adjacent to pivot pin 39 and for the major portion of said rod 38 is offset to lie in a plane adjacent the front of the shutter 21 and it passes through a transverse hole in the head 41 of a stud 42 tapped into the shutter 21 at the center. A set screw 43 is threaded into the end of the stud 41 and intersects the hole through which the rod 38 passes so that said screw 43 may be caused to bind against the rod 38. A winged head 44 or equivalent formation is provided on the screw 43 for turning it. By loosening the screw 43 the rod 38 may slide freely through the head 41 and therefore the shutter 21 may be freely swung on its hinge pin 36. Thus, the shutter 21 may be open to any desired angle or may be swung completely to the open position out of the path of movement of the port light frame 12 for permitting the latter to be opened. The shutter 21 is shown as provided with the usual fastening lug 45 having a slot 46 to receive the wing bolt 47 pivoted as at 48 to fixed lugs 49 on frame 10. It will be apparent that the above described devices permit of the convenient opening or closing of the shutter 21 or the port light and that the fastening and adjusting means obviate the disadvantages and inconveniences that are incident to the use of chains and other means ordinarily provided for holding the port light open.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A port light and frame therefor each having hinge lugs, a hinge pin passing through the respective lugs, one of the lugs on the port light having an arcuate slot, and a clamp spindle passing through said slot and engaging the first-mentioned lug, said spindle adapted to exert a clamping action on the lugs to hold the port light against turning on the hinge pin.

2. A port light hingedly mounted, and means associated with the hinge to prevent movement of the port light on said hinge; together with a hingedly mounted shutter for said port light adapted to be swung away from the path of swinging of said port light, a rod hinged at one end and extending across the center of the shutter, a member on the shutter at the center thereof through which said rod extends, and means to bind the rod at said member to prevent movement of said rod.

DANIEL NECHRONI.